United States Patent [19]
Keskitalo et al.

[11] Patent Number: 5,893,033
[45] Date of Patent: Apr. 6, 1999

[54] METHODS FOR MAKING A FASTER HANDOVER, AND A CELLULAR RADIO SYSTEMS

[75] Inventors: Ilkka Keskitalo, Oulu; Peter Muszynski; Petri Jolma, both of Espoo; Jaana Laiho-Steffens, Veikkola, all of Finland

[73] Assignee: Nokia Telecommunications: Oy, Espoo, Finland

[21] Appl. No.: 765,844

[22] PCT Filed: May 23, 1996

[86] PCT No.: PCT/FI96/00292

§ 371 Date: Jan. 24, 1997

§ 102(e) Date: Jan. 24, 1997

[87] PCT Pub. No.: WO96/38015

PCT Pub. Date: Nov. 28, 1996

[30] Foreign Application Priority Data

May 24, 1995 [FI] Finland ..................................... 952529

[51] Int. Cl.⁶ ..................................... H04Q 7/20
[52] U.S. Cl. ..................... 455/437; 455/440; 455/456; 455/562
[58] Field of Search ..................... 455/436–439, 455/440–441, 443–444, 524–525, 562, 456

[56] References Cited

U.S. PATENT DOCUMENTS

| | | |
|---|---|---|
| 5,293,642 | 3/1994 | Lo . |
| 5,327,575 | 7/1994 | Menich et al. ........................... 455/437 |
| 5,432,843 | 7/1995 | Bonta ..................................... 455/437 |
| 5,509,051 | 4/1996 | Barnett et al. . |
| 5,513,380 | 4/1996 | Ivanov et al. ............................ 455/441 |
| 5,603,089 | 2/1997 | Searle et al. ............................ 455/562 |
| 5,640,676 | 6/1997 | Garncarz et al. ........................ 455/436 |

FOREIGN PATENT DOCUMENTS

| | | |
|---|---|---|
| 0 530 165 A2 | 3/1993 | European Pat. Off. . |
| 78567 | 12/1987 | Finland . |
| 891413 | 4/1991 | Finland . |
| WO 92/02105 | 2/1992 | WIPO . |
| WO 93/12590 | 6/1993 | WIPO . |
| WO 95/09513 | 4/1995 | WIPO . |

OTHER PUBLICATIONS

EIA/TIA Interim Standard: Mobile Station–Base Station Compatibility Standard for Dual–Mode Wiseband Spread Spectrum Cellular System, TIA/EIA/IS–95, Jul. 1993, 6–83 thru 7–22.

A.F. Naguib, A. Paulraj: Performance of CDMA Cellular Networks with Base–Station Antenna Arrays; International Zurich Seminar on Digital Communications; Mar. 1994; pp. 87–100.

*Primary Examiner*—Nguyen Vo
*Attorney, Agent, or Firm*—Pillsbury Madison & Sutro LLP

[57] ABSTRACT

The base stations of a cellular radio system direct their respective antennas effectively towards the terminal equipment with which they are respectively communicating. Each terminal equipment maintains and updates a list of base stations serving and potentially available to serve the respective terminal equipment. Updating is based on measuring signal strengths and directions, as well as directions of motion of the respective terminal equipment, so that each list, as updated includes only those base stations serving, and on the basis of forecast direction of movement of the terminal equipment, likely to be able to serve the respective terminal equipment. The terminal equipment measure signal strengths for the listed base stations, to determine the need for a handover.

14 Claims, 10 Drawing Sheets

METHODS FOR MAKING A FASTER HANDOVER, AND A CELLULAR RADIO SYSTEMS

This application is the national phase of international application PCT/FI96/00292, filed May 23, 1996.

BACKGROUND OF THE INVENTION

The invention relates to a cellular radio system comprising in each cell at least one base station communicating with terminal equipments located within its area, which base stations comprise means for measuring the direction angle and distance of each terminal equipment with respect to the base station, means for calculating the location of each terminal equipment in the coverage area of the base station on the basis of the direction angle and distance of the terminal equipment, and which terminal equipments comprise means for maintaining a list of nearby base stations, and means for measuring the signal strength from the base stations that are in the list kept by the terminal equipment, in order to determine the need for a handover.

The present invention is applicable for use in a data transmission system applying any multiple access method, but especially in a cellular system utilizing code division multiple access. Code division multiple access (CDMA) is a multiple access method, which is based on the spread spectrum technique and which has been applied recently in cellular radio systems, in addition to the earlier developed FDMA and TDMA methods. CDMA has several advantages over those earlier developed methods, for example spectral efficiency and the simplicity of frequency planning. An example of a known CDMA system is disclosed in the EIA/TIA Interim Standard: Mobile Station-Base Station Compatibility Standard for Dual-Mode Wideband Spread Spectrum Cellular System, TIA/EIA/IS-95, July 1993, EIA/TIA IS-95, which is incorporated herein by reference.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection, between a respective base station and a respective mobile station, and the signals of the different users can be distinguished from one another in the receivers on the basis of the spreading code of each user.

Matched filters provided in the respective receivers are synchronized with a desired signal, which they recognize on the basis of a spreading code. The data signal is restored in the respective receiver to the original band by multiplying it again by the same spreading code that was used during the transmission. Signals multiplied by some other spreading code do not correlate in an ideal case and are not restored to the narrow band. They appear thus as noise with respect to the desired signal. The spreading codes of the system are preferably selected in such a way that they are mutually orthogonal, i.e. they do not correlate with each other.

In a CDMA cellular radio system, it is possible to use a so-called pilot channel in the transmission direction of base stations to subscribers, i.e. in the downlink direction. A pilot channel is a signal which is transmitted with a specific spreading code and utilizing the same frequency band on which the actual traffic channels are situated, the pilot signal being distinguishable from them only on the basis of the spreading code. The pilot signal is a channel known and listened to by all subscriber equipments within the cell area, and it is used, for example, in power measurements and in the generation of a coherent phase reference. Each base station of the system transmits its own pilot signal on the basis of which the subscriber equipments can distinguish the transmissions of different base stations from each other.

In a typical mobile phone environment, the signals between a base station and a terminal equipment propagate along several paths between the transmitter and the receiver. This multipath propagation is mainly due to the reflections of the signal from surrounding surfaces. Signals which have propagated along different paths arrive at the receiver at different times, due to their different transmission delays. In the CDMA system, the multipath propagation can be exploited in the reception of the signal in the same way as diversity. The receiver generally utilized in a CDMA system is a multibranch receiver structure, where each branch is synchronized with a signal component which has propagated along an individual path. Each branch is an independent receiver element, the function of which is to compose and demodulate one received signal component. In a conventional CDMA receiver, the signals of the different receiver elements are combined advantageously, either coherently or incoherently, whereby a signal of good quality is achieved.

CDMA systems can also apply a soft handover, wherein a mobile station may simultaneously communicate with several base stations by utilizing macrodiversity. The connection quality of the mobile station thus remains high during the handover and the user does not notice a break in the connection.

Interference caused in a given connection, by other connections thus appears in a receiver of the given connection as noise that is evenly distributed. This is also true when a signal is examined in an angular domain according to the incoming directions of the signals detected in the receivers. The interference caused by the other connections in the given connection thus also appears in respective receiver as distributed in the angular domain, i.e. the interference is rather evenly distributed across the different incoming directions.

The capacity of the CDMA system, which can be measured by means of spectral efficiency, has been further improved with sectorization. When sectorization is implemented, a cell is divided into sectors of a desired size that are serviced by directional antennas. The mutual noise level caused by the mobile stations can thus be reduced significantly in the base station receiver. This is based on the fact that, on average, the interference is evenly distributed across the different incoming directions, the number of which can thus be reduced by means of sectorization. The sectorization can naturally be implemented in both transmission directions. The advantage provided in the capacity by the sectorization is proportional to the number of the sectors.

A sectorized cell may also utilize a softer handover, wherein a mobile station performs a handover from one sector to another by communicating simultaneously with both sectors. Even though soft handover improves the connection quality and sectorization increases the system capacity, the movement of the mobile stations naturally leads to the stations performing several handovers from one sector to another. This loads the processing capacity of the base station controller. Several soft handovers also produce a situation where several mobile stations communicate simultaneously with more than one sector (usually, two sectors), whereby the increased capacity provided by the sectorization is lost as a signal of a mobile station is audible in a wide sector.

The multiple access interference of the CDMA systems has also been reduced by means of different known multiple access interference cancellation (IC) methods and multi-user detection (MUD). These methods are best suited for reducing the interference produced within a user's own cell, and the system capacity can thus be increased to about a double, compared to a system implemented without interference cancellation. However, these methods do not significantly improve the size of the coverage area of a base station. Also, the IC/MUD techniques are complicated to realize, wherefore they have only been developed in the uplink direction, and the opposite transmission direction is similar to that of a conventional CDMA system.

Another method that has been developed is an SDMA (Space Division Multiple Access) method wherein the users are distinguished from one another on the basis of their location. This is performed in such a way that the beams of the receiver antennas at the base station are adjusted to be directed towards the desired directions according to the locations of the mobile stations. For this purpose, the system uses adaptive antenna groups, i.e. phased antennas, and processing of the received signal, by means of which the mobile stations are tracked.

The use of SDMA in connection a CDMA system provides several advantages over the prior methods, such as sectorization. If the sector beams in the sectorization are narrowed in order to increase the spectral efficiency, the number of the handovers to be performed from one sector to another also increases. This in turn excessively increases the calculation capacity required in the base station controller.

In connection with the application of SDMA, the background art is illustrated in A.F. Naguib, A. Paulraj: *Performance of CDMA Cellular Networks With Base-Station Antenna Arrays* (Proc. International Zhrich Seminar on Digital Communications, pp. 87–100, Zhrich, Switzerland, March 1994), which is incorporated herein by reference. In SDMA, a signal is thus received by means of an antenna group, and the received signal is shaped by means of digital signal processing in such a way that the directivity patterns of the antennas are suitable for the stages following the shaping in the receiver. In prior art arrangements, the received signal is shaped in order to maximize the signal-to-interference ratio of the desired signal. The received signal is thus shaped in such a way that the directivity pattern of the antenna group minimizes the interference caused by the other connections in the desired signal. In the arrangement according to the aforementioned Naguib publication, each detected signal component is subjected to individual beam shaping, i.e. the impulse response must be known before the shaping is performed.

The subscriber equipments continuously measure the strength of the signal they have received from the base station. In CDMA systems, the signal measurement is generally performed as the measurement of the pilot signal. In order to reduce the measurement load of a terminal equipment, in the prior art systems each terminal equipment keeps a list of the base stations that are situated near respective terminal equipment and that are possible candidates for handover or call set-up, and of the corresponding spreading resoective pilot signals. This list is called hereinafter in this document will be called below a measurement list. The terminal equipments monitor with the highest priority the pilot signals of only those base stations that are on the measurement list. The other detected pilot signals are measured secondarily.

When a terminal equipment moves, the measurement list must be updated as the need arises. The updating is performed in the prior art systems according to the measurement of the strength of the pilot signal performed by the terminal equipment, i.e. if it is detected on the basis of the measurement of the terminal equipment that a pilot transmitted by some base station is received with sufficient strength, the base station is added in the measurement list, and correspondingly if the signal from some base station deteriorates, the base station is removed from the list.

In order to enable a fast handover, the measurement list should be as short as possible and it should contain only those base stations to the respective areas of which the terminal equipment is likely to move. In such a case, the terminal equipment can perform the measurements rapidly. The updating of the measurement list should also be fast. This is true especially in systems where the cell sizes are rather small compared to the speed of movement of the terminal equipment.

In prior art arrangements, as in the EIA/TIA IS-95 arrangements already mentioned above, the measurement list is maintained on the basis of the measured strengths of the received signals. The list cannot then be made very short, in order that no essential base stations are left out of it. Therefore, the rate of handover is not the best possible, especially with respect to small microcells.

A prior art arrangement is illustrated in FIG. 1 of the attached drawings, which shows a system comprising a group of base stations 164 to 168 the coverage areas of which are each divided into three sectors, and a subscriber equipment 102, which is situated in the area of the base station 167 and which communicates with it in a sector 162. The subscriber equipment receives not only the signal from its own base station sector 162, but also signals from the surrounding sectors. The list of each terminal equipment typically comprises most of the surrounding sectors, in the example of FIG. 1, sectors 150 to 160, and the terminal equipment continuously monitors the signals of these sectors.

SUMMARY OF THE INVENTION

The purpose of the invention is to enable the maintenance of a short measurement list, which only contains the base stations to the respective areas of a respective the terminal equipment is most likely to move. Another purpose of the invention is to enable rapid handovers of a terminal equipment from one base station to another.

This is achieved with the cellular radio system of the type described in the foregoing BACKGROUND section, characterized in that the terminal equipments in the system comprise means for updating the list of nearby base stations maintained by each terminal equipment on the basis of the location of each terminal equipment.

The invention also relates to a method for improving the reliability of a handover in a cellular radio system, which comprises in each cell at least one base station communicating with subscriber equipments located within its coverage area, which base stations measure the distance of each terminal equipment respective base station, and the direction angle of the signal received from the terminal equipment with respect to the base station, and which base stations calculate the location of each terminal equipment in the coverage area respective base station on the basis of the direction angle and distance respective terminal equipment, and which terminal equipments measure the signal strengths from the respective base stations that are in the list of nearby base stations maintained by the terminal equipment, in order to determine the need for a handover. The method according to the invention is characterized in that the list of nearby base stations maintained by each terminal equipment is updated on the basis of the location calculated for each terminal equipment.

With the arrangement according to the invention, it is possible to keep the measurement list of each terminal equipment as short as possible and to thereby enable rapid measurements and handovers from one cell to another. The method according to the invention provides advantages especially in an environment where there is also a so-called umbrella cell in the respective areas of several microcells for fast moving terminal equipments. The umbrella cell can be implemented with an adaptive antenna group, and thus, due to the fast measurement made possible by the invention, the terminal equipment can measure the strengths of the microcells also when communicating with a macrocell, and it can perform a flexible handover to a microcell, if required.

In the first preferred embodiment of the invention, the signal to be transmitted and the received signal are processed digitally on a base band, whereupon the antenna beams can be oriented directly in the desired directions with the phasing of the signal. In the second preferred embodiment of the invention, the signal phasing is performed analogically, whereupon a group of fixed antenna beams is provided, and the beams providing the best connection are selected from these beams for reception and transmission.

BRIEF DESCRIPTION OF THE DRAWINGS

In the following, the invention will be described in greater detail with reference to the examples according to the accompanying drawings, in which.

DETAILED DESCRIPTION

In the following, the method and receiver according to the invention will be described in greater detail using the CDMA system as an example, but not restricting the description thereto, however, since the invention is also applicable in connection with other multiple access methods, as will be evident for a person skilled in the art on the basis of the description provided hereinbelow.

Figure 1:
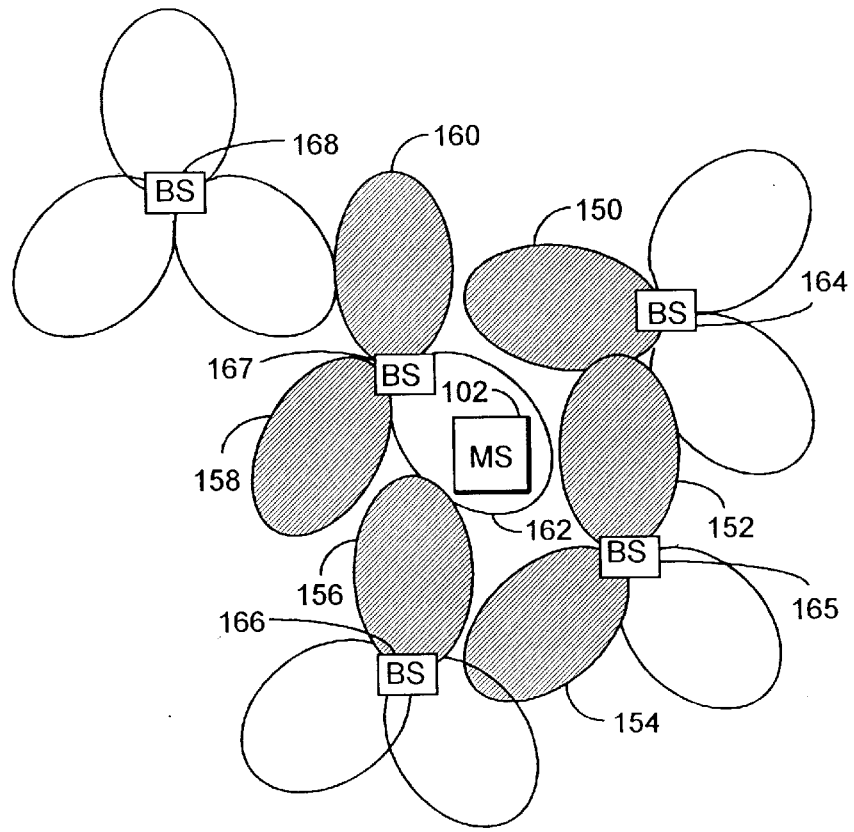
FIG. 1 illustrates the above-described example of a prior art manner of forming a measurement list.
Figure 2:
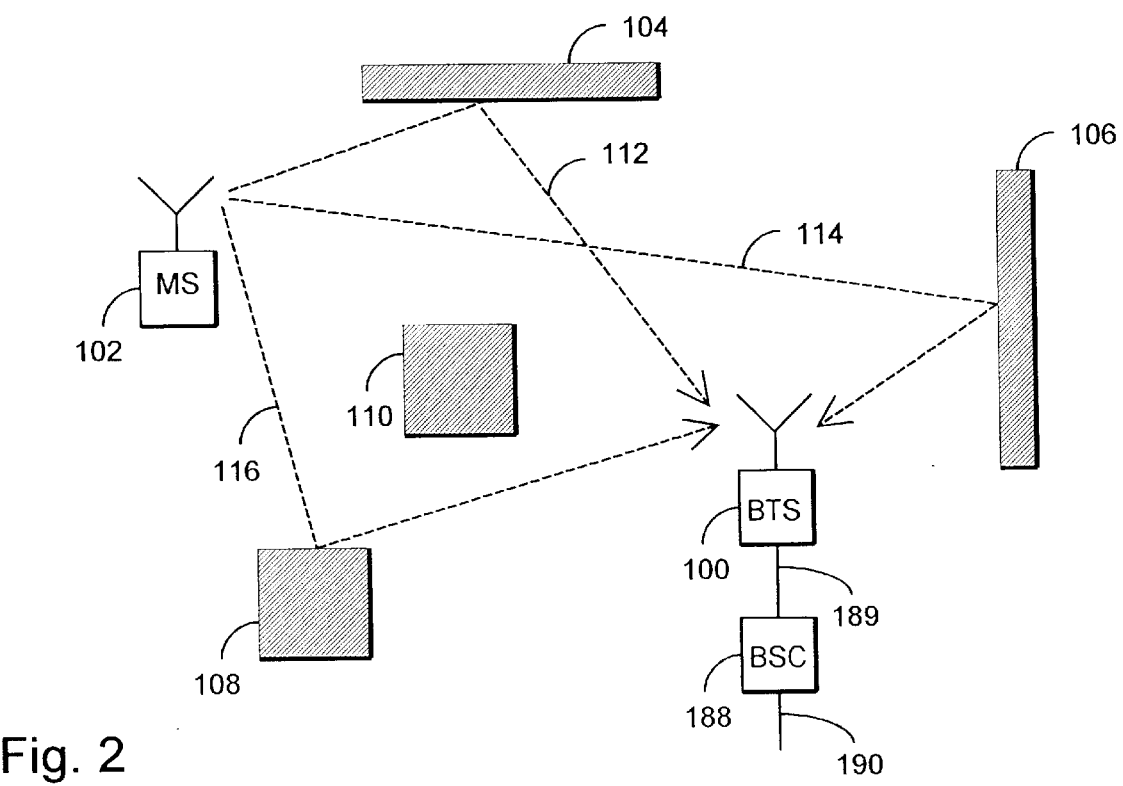
FIG. 2 illustrates a cellular radio system according to the invention and the multipath propagation of a signal between a terminal equipment and a base station.

FIG. 2 illustrates a cellular radio system according to the invention. The system comprises a base station 100 and a subscriber equipment 102 that is in radio communication with the base station 100. The base station is connected by digital transmission lines 189 to a base station controller 188, which is further connected 190 to other parts of a network and to a fixed network.

FIG. 2 illustrates the typical multipath propagation of a transmitted signal in a cellular system. A characteristic feature of cellular radio systems is that the mobile stations are surrounded by surfaces that reflect and scatter radio waves. Such surfaces may be, for example, buildings and, walls, and obstructions formed by the nature, such as mountains and hills. Mobile stations typically transmit with an omnidirectional antenna pattern. The figure illustrates a few rays 112, 114, 116 originating from a mobile station. The surfaces 104, 108 situated close to the mobile station 102 reflect the transmitted signal, which therefore arrives at the antenna of the base station 100 along several different paths, but the delay between the different signal components is rather small. The reflecting surfaces situated further from the mobile station, such as larger buildings and mountains, denoted in this figure by numeral 106, produce signal components 114 which arrive at the base station 100 several, even dozens of microseconds later. There may also be obstacles 110 in the terrain that the establishment or functioning of a direct connection between the mobile station and the base station.

Figure 3A:
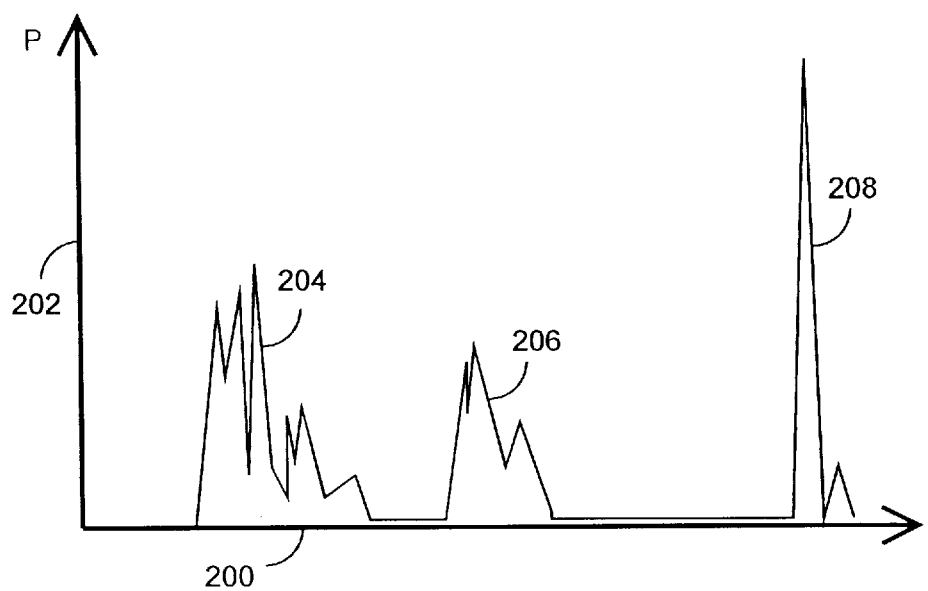
FIG. 3a illustrates, in a time domain, the scattering caused by the multipath propagation of a signal.

FIG. 3a illustrates, in a time domain, an example of a momentary delay of signal components caused by the multipath propagation of the signal at a base station receiver. The horizontal axis 200 of the schematic figure shows the time, and the vertical axis 202 shows the power of the received signal. In the example of FIG. 3a, the base station receiver has detected three groups of signal components 204, 206, 208 which have arrived at the receiver at different times, and among which the component 208 is significantly more delayed than the others.

Figure 3B:
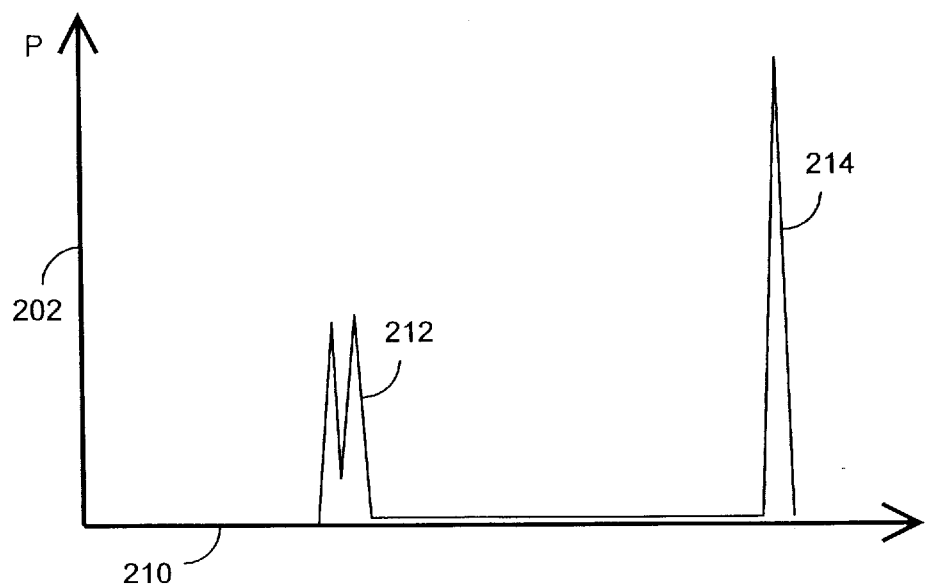
FIG. 3b illustrates, in a angle-of-arrival domain, the scattering caused by the multipath propagation of a signal.

As the example of FIG. 2 shows, the different signal components arrive not only at different times but also from different directions. It can thus be said that the signal scatters not only in the time domain, but also in the angular domain, which can be described as the angle of arrival (AoA) of the signal. FIG. 3b illustrates an example of a momentary scattering as a function of the angle of arrival, caused by the multipath propagation of the signal, at the base station receiver. The vertical axis 202 of FIG. 3b shows the power of the received signal component, and the horizontal axis 210 shows the angle of arrival. In the example of FIG. 3b, the signal components 212, 214 arrive from two directions.

In large cells, so-called macrocells, wherein the base station antennas are situated above the surrounding terrain, including buildings, walls and other obstacles, the signal components generally arrive at the antenna with only a few different angles of arrival, which are usually at the vicinity of the direct ray between the mobile station and the base station. In small microcells where the base station antennas are usually situated below the roofs of buildings, the angles of arrival of the signal components are found to show far greater dispersion, since, in the same way as the mobile stations, the base stations are often surrounded by several reflecting surfaces, which are situated near by.

Multipath propagation has been described above in the uplink transmission direction. It is clear that a corresponding phenomenon also occurs in the opposite downlink direction. It can also be stated that the multipath routes are mainly symmetrical in both directions, since the scattering and reflection are not greatly dependent on the frequency. However, it should be noted that fast signal fadings are mutually independent in different transmission directions. Therefore, if the base station detects a signal component that has arrived from a respective mobile station at the angle of arrival of $\alpha_o$, transmitting a signal with the same angle ao guides the signal in the direction of the mobile station, except for fast fadings.

On the basis of the above, it can be stated that the multipath propagating environment typical of cellular systems leads in the base stations to the reception of a signal which is distributed in time into several components that are delayed differently and in the angular domain into components arriving from several different directions. Both distribution profiles vary in time since the subscriber equipments move, but the variation is rather slow, i.e. in the range of a few seconds, and the profiles can be synchronized with and they can be monitored.

The received signal components are thus characterized by the multidimensionality of the type described above that is illustrated above with the time-angular domain, i.e. ($\alpha$, $\tau$) domain, and that can be utilized in the base station according to the invention for improving the detection of the signal to be received. In the method according to the invention, the best signal components of the received signal are searched for in the multidimensional signal domain, the receiver being controlled by means of the components in such a way that the detected components preferably are combined, and detected. The most simple standard for the signal quality can be the received power level, but also other standards can be used, for example the signal-to-noise ratio.

Figure 5:
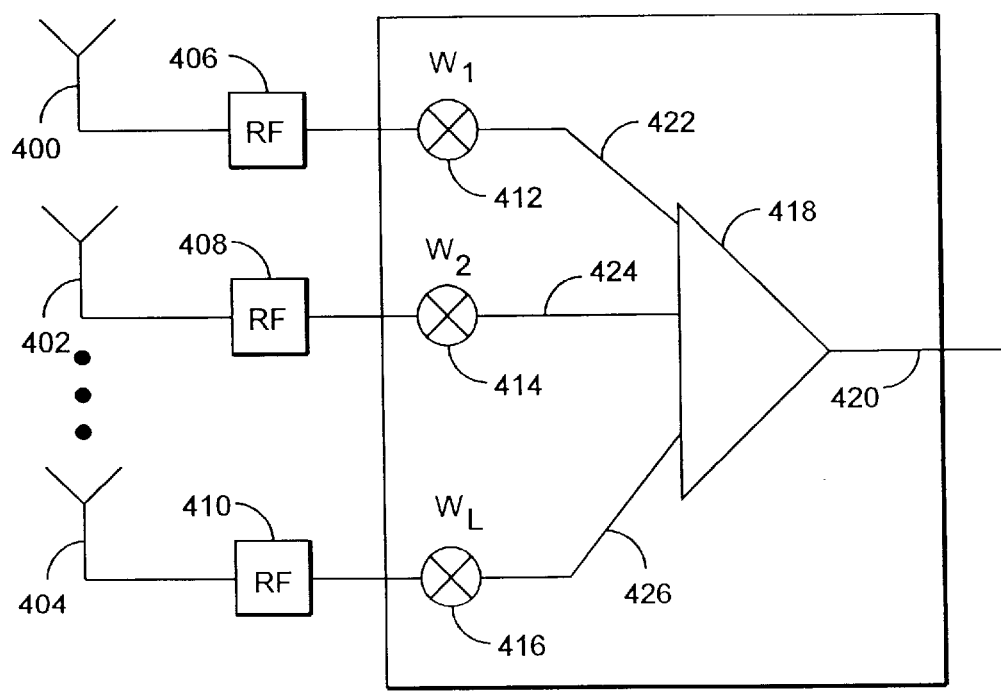
FIG. 5 shows a possible implementation of an adaptive antenna group.

The receiver according to the preferred implementation of the invention utilizes an adaptive antenna group, which is an antenna group consisting of several different elements. FIG. 5 illustrates a possible implementation of an adaptive antenna group, which can be applied in connection with the first preferred embodiment of the invention. The antenna group comprises L antenna elements 400, 402, 404, which may be, for example, omnidirectional antennas. Each antenna element is connected to radio-frequency parts 406, 408, 410, which convert the received signal into an intermediate frequency and sample the signal into (I,Q) components according to known technology. The obtained complex samples are then multiplied by the corresponding complex weighting coefficients $w_i$, wherein i=1, . . . ,L, in multipliers 412, 414, 416. The samples 422, 424, 426 that have thus been multiplied are applied via an adder 418 to other parts of the receiver.

The complex weighting coefficients wi are selected according to an algorithm, which is usually adaptive, in such a way that an antenna pattern of the desired shape is achieved. This manner of shaping the received signal can be called digital phasing of the signal, since it is performed on a signal digitized on the base band, but due to this shaping the received signal antenna gain can be oriented in the desired directions. An antenna group, as such, may comprise either directional or omnidirectional antenna elements. Phasing the signal obtained from the different antennas and combining the phased signals produces kind of virtual antenna beams directed towards the desired directions. A corresponding treatment can also be performed on the signal to be transmitted, whereby a desired radiation pattern can be achieved.

Figure 4:
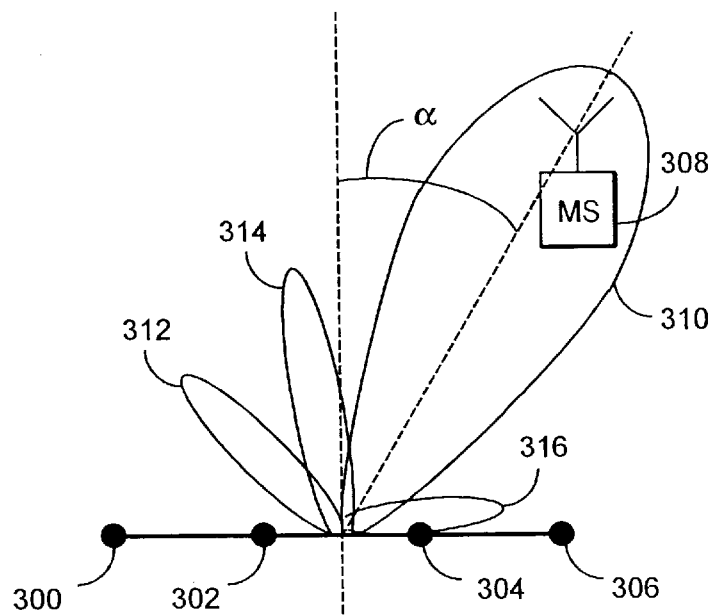
FIG. 4 illustrates a possibility of orienting the beam of the base station antennas towards a mobile station.

FIG. 4 illustrates how an antenna group consisting of an evenly spaced linear group comprising four elements 300, 302, 304, 306 produces a strongly directed beam 310 with the angle of arrival of a towards a mobile station 308. A group of smaller side beams 312 to 316 is also formed. This directivity can thus be implemented with the signal phasing without the antennas, as such, being directional.

In the arrangement according to the preferred implementation of the invention, the multiple access interference of the receiver is reduced with antenna beams that are directed in the angular domain and that are produced by means of a new type of receiver applying time-angle diversity. In the arrangement according to the preferred implementation of the invention, the angles of arrival measured from the received signal can also be used in the transmission direction, whereby the connection quality is improved in both transmission directions.

In the following, the first preferred embodiment of the invention, which relates to applying the digital phasing of the signal in the CDMA system, will be described first.

The receiver applying time-angle diversity used at the base station comprises digital receiver means that can monitor the received signal components in the two-dimensional ($\alpha$ $\tau$) domain and demodulate the desired signal components. Before the demodulation, the received digitized signal samples are subjected to phasing by means of which the antenna gain of the received signal is oriented in the desired signal incoming directions. In the preferred embodiment, the antenna beams produced by the phasing are beams having a predetermined shape that is determined by the weighting coefficients wi and the antenna geometry. These coefficients can easily be calculated for each angle of the greatest gain, if the shape of the antenna beam, as such, remains constant. Therefore, the phasing can be adjusted rapidly since it is only dependent on one parameter, i.e. the angle of arrival $\alpha$.

In the method according to the invention, there is no need to apply known complicated techniques, such as MUSIC, for estimating the angle of arrival or adaptive algorithms, such as LMS and DMI. Even though these algorithms enable the calculation of the optimal beam shape for the signal to be received, so that the signal-to-noise ratio of the desired signal can be maximized by directing the zero points of the antenna pattern towards the sources of interference, this is not necessary in connection with the CDMA system since, as described above, in the CDMA, the interference signal is distributed to resemble noise without having any clear directions of interference source. Therefore, it is sufficient in an environment with evenly distributed interference that the angles of the greatest gain of the antenna beams having a predetermined shape are pointed in the directions from which the best signal components are received. This enables the implementation of a simpler receiver compared to the prior art.

In the method according to the invention, the receiver thus searches for the desired signal components in the ($\alpha$ $\tau$)

domain. This is performed by cross-correlating the received spread-spectrum signal with the desired spreading code and by comparing the obtained measurement results with the threshold values given. The search can be understood as if it included a sweep of an antenna beam over the given area, simultaneously performing the measurement of the channel impulse response and the collection of the signal energy of the terminal equipments received from each direction. The receiver thus detects the direction and code phase of the reception of the best signal components and allocates a required number of demodulation means for synchronizing with and receiving these signal components. The received demodulated signal components can be combined in the receiver. The search for the best signal components is performed continuously and the allocation of the demodulation means is changed, if necessary.

The receiver thus knows at all times the directions from which the best signal components from the mobile stations are received. This information can also be used in the base station equipment according to the invention in the downlink direction. This may be performed, for example, in such a manner that the controller of the transmitter-receiver informs the transmitter unit of the directions where significant signal components have been detected. The transmitter unit may phase the signal to be transmitted with the adaptive antenna group in such a way that the angles of the greatest gain of the antenna beams point in the desired directions. There may be one or more transmission beams and their number may also differ from the number of the receiver beams.

This method provides considerable interference cancellation also in the downlink direction. The antenna group used in the transmission may be the same as the antenna group used in the reception. It may also be a separate antenna group. The signal phasing is performed in the same way as during the reception with the weighting coefficients.

In the arrangement according to the invention, the base stations measure the distance of a terminal equipment from the base station, and the measurement can be performed in manners known for a person skilled in the art, for example on the basis of the transmission delay detected over the connection. On the basis of the respective distance measured and the incoming direction of the respective signal obtained by means of adaptive antennas, the base station calculates the location of the respective terminal equipment in the coverage area.

On the basis of this location, it is possible to estimate better the base stations to the area of which the respective terminal equipment is most likely to move.

In the arrangement according to the first preferred embodiment of the invention, the directions of the antenna beams used for transmitting and receiving a signal in a base station are deflected by small degrees ) $\Delta\alpha_i$ in the environment of the measured desired directions $\alpha_i$. This produces angular diversity in a signal, whereby the likelihood of a fading can be reduced by means of the diversity, especially when the respective mobile station does not move.

Figure 6:
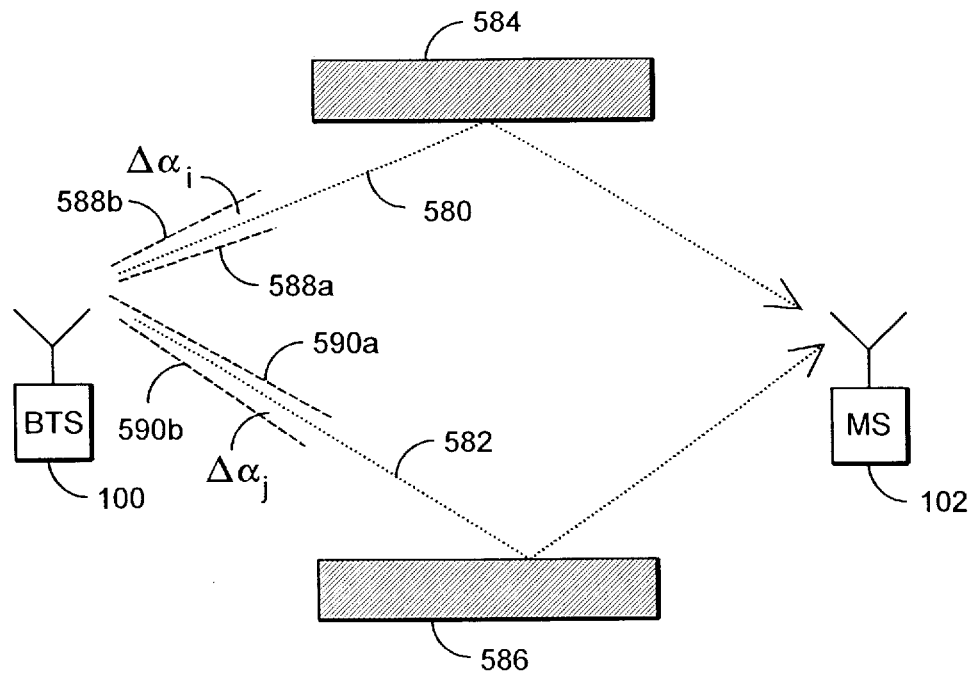
FIG. 6 illustrates the implementation of angular diversity in a cellular radio system according to the invention.

The method is illustrated in FIG. 6, where the base station 100 transmits a signal to the mobile station 102 by using two beams 580, 582, which are reflected, in the example of the figure, from two obstacles 584, 586 in the terrain. In the arrangement according to the invention, the base station deflects each antenna beam in the environment of the desired directions by certain angles) $\Delta\alpha_i$ and $\alpha_i$, whereupon the antenna beams thus propagate at times along different paths 588a to 588b and 590a to 590b, respectively. The deflection is performed continuously on the given frequency, whereupon desired variations occur in the signal received by the respective mobile station, the likelihood of long fading being reduced by means of the variations. With the variation, it is possible to randomize the fading statistics, so that the effects of fadings can be prevented better by means of channel coding and interleaving.

When the arrangement is applied in the reception of a signal from a mobile station, the directional angles of the antenna beams used in the reception of the signal are thus deflected by small degrees $\Delta\alpha_i$ in the environment of the desired directions $\alpha_i$ measured. In this manner, small desired changes are produced in the received signal in this transmission direction. The deflection performed does not affect the power levels of the received signal, since, in practice, the antenna beams are usually considerably wider than the deflection angles used. The width of the antenna beams can be, for example, of the magnitude of 10 degrees and the deflection angle can be, for instance, one degree. The widths and deflection angles of the antenna beams used vary, depending on the application.

The base station monitors the changes in the angle of arrival of the signal from the terminal equipment, as well as the changes in the transmission delay between the terminal equipment and the base station, and it can estimate the location and direction of motion of the terminal equipment on the basis of these parameters. The measurements of the angle of arrival and the delay can be performed at even intervals, the measurement results can be filtered and the future behavior of the terminal equipment can be predicted on the basis of the values thus obtained, by using a known prediction algorithm.

On the basis of the location and the direction of motion of the terminal equipment, it is possible to estimate rather accurately the base station to the area of which the respective terminal equipment is moving, whereupon the measurement list can be kept very short without a risk of the connection breaking down due to an unsuccessful selection of a base station.

The method according to the invention enables there to me made a more reliable handover, especially in microcells on street corners, when the terminal equipment moves around a street corner and simultaneously changes from one coverage area to another. In such a situation, the signal level of the terminal equipment changes suddenly, either increasing or decreasing typically 15 to 20 dB. With the method according to the invention, it is possible to predict when a terminal equipment will arrive at a street corner, on the basis of the location of the terminal equipment.

The decision of updating the measurement list can typically be made in the base station controller 188, and the information can be forwarded to the terminal equipment 102, which updates its own list on the basis of this control.

Figure 7A:
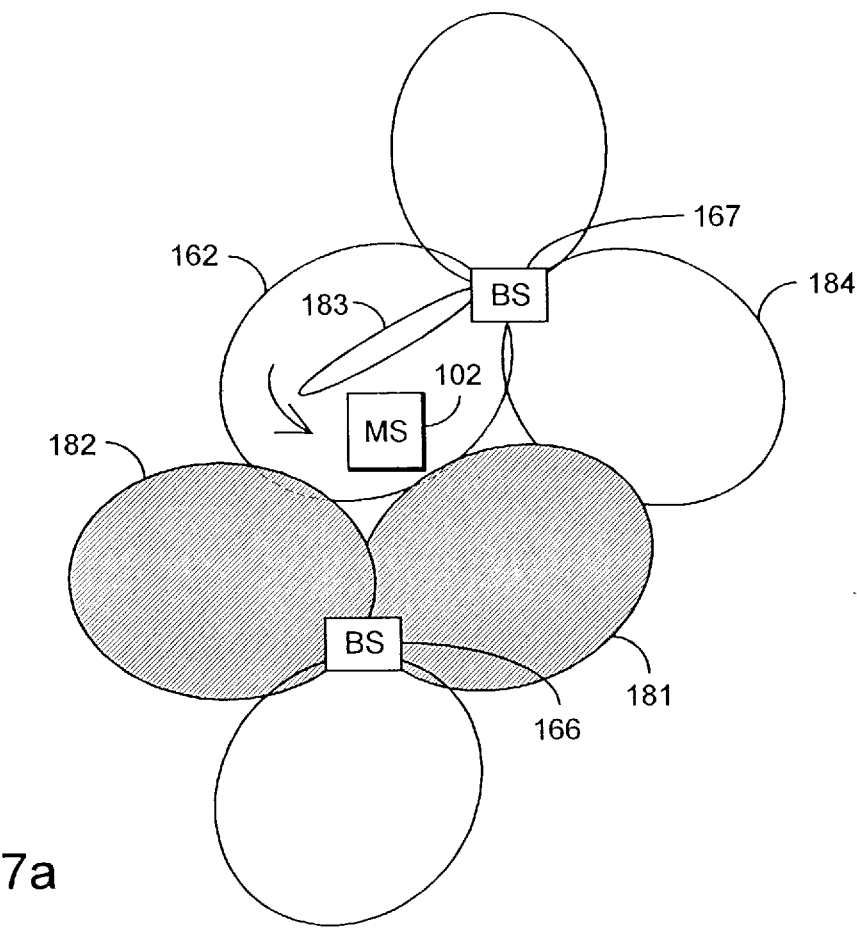
FIG. 7a illustrates an example of forming a measurement list in a system according to the invention.

FIG. 7a illustrates an example of a situation wherein a terminal equipment 102 of the cellular system is located in the area of the base station 167 in sector 162, and the base station applies the technique of the adaptive antenna groups according to the invention. The base station 167 monitors the terminal equipment 102 with one or several mobile antenna beams 183. The base station 167 has determined the location and direction of motion of the terminal equipment 102, using the above-described methods, and the measurement list of the terminal equipment can be considered to contain only the sectors to which the terminal equipment 102 is likely to move. In the situation of FIG. 7a, the assumed sectors are 181 and 182. Even though the terminal equipment probably also receives a signal from the sector 184, it is not assumed to be likely to move to the area of this sector on the basis of its location.

Figure 7B:
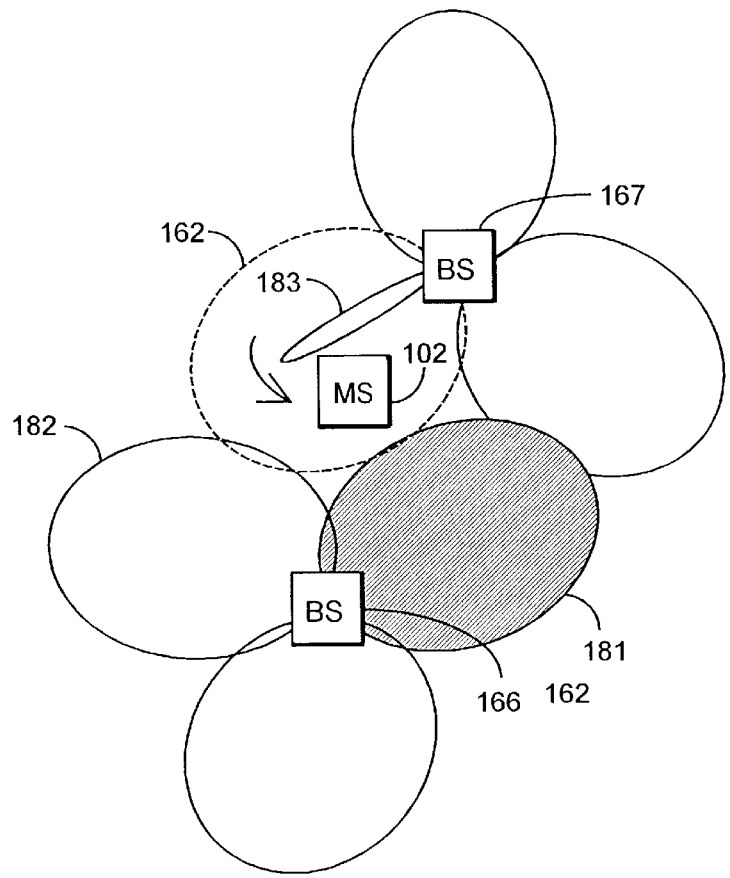
FIG. 7b illustrates another example of forming a measurement list in a system according to the invention.

FIG. 7b illustrates another example of a situation wherein the terminal equipment 102 of the cellular system is in the area of the base station 167 in the sector 162, and the base station applies the technique of the adaptive antenna groups according to the invention. The base station 167 monitors the terminal equipment 102 with one or several mobile antenna beams 183. In the same way as has been explained above, the base station 167 has determined the location and direction of motion of the terminal equipment 102, and the measurement list of the terminal equipment can again be considered to contain only the sectors to which the terminal equipment 102 is likely to move. In the situation of FIG. 7b, the only assumed sector is 181. On the basis of its location and direction of motion, the terminal equipment 102 is not assumed to be likely to move, for example, to sector 182.

Figure 7C:
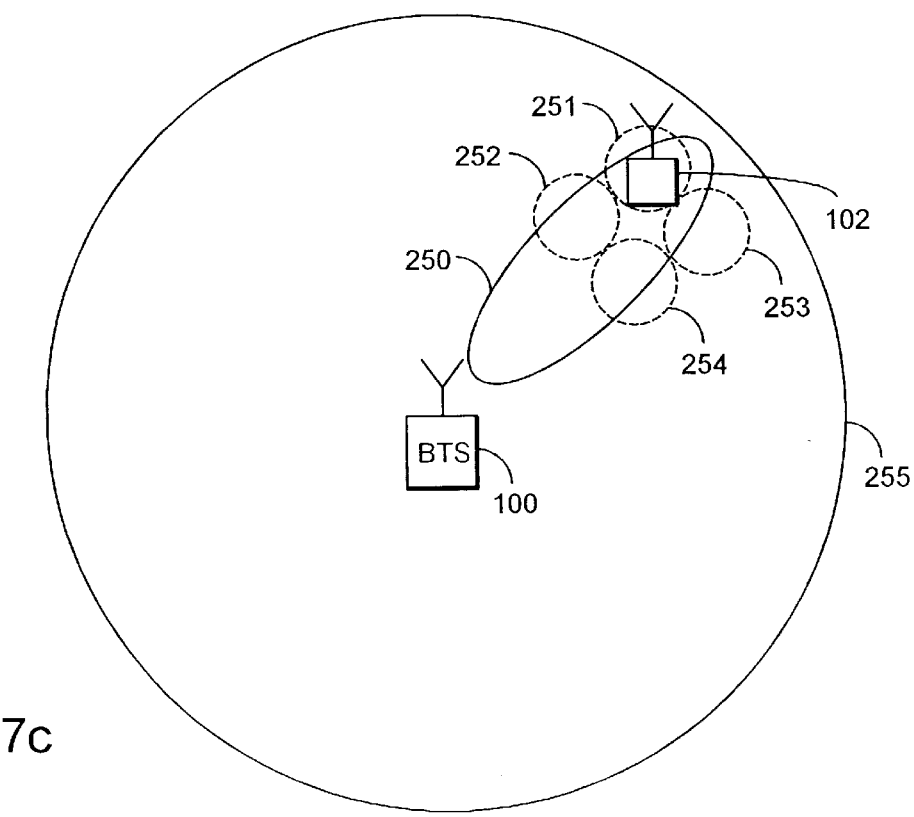
FIG. 7c illustrates an umbrella cell in a microcell environment.

FIG. 7c illustrates an example of a cellular radio system, which comprises a subscriber equipment 102, a group of rather small microcells 251 to 254, and an umbrella cell 255 overlapping the microcells. Such an implementation can often be found in areas which require a high traffic capacity that is offered by microcells and in which fast-moving terminal equipments need services that are provided by means of a large umbrella cell, in order to avoid several handovers from one microcell to another.

The umbrella cell 255 shown in the figure is implemented in a manner, according to the invention, in such a way that the base station 100 uses phased antenna groups which produce antenna beams 250 pointing in the direction of the terminal equipment. With the method according to the invention, the measurement list of the terminal equipment 102 can include the microcells that are known to be situated in the same area as the terminal equipment. The base station controller (not shown in the figure) controlling the base station 100 is aware of the microcells within the area of the umbrella cell and it can update the measurement list of the terminal equipment on the basis of the location and the direction of motion of the equipment so that the list contains the microcells situated within the same area.

The method according to the invention for updating the measurement list can also be applied in such a way that the base stations on the measurement list are prioritized on the basis of the location and the direction of motion of the terminal equipment.

Figure 8:
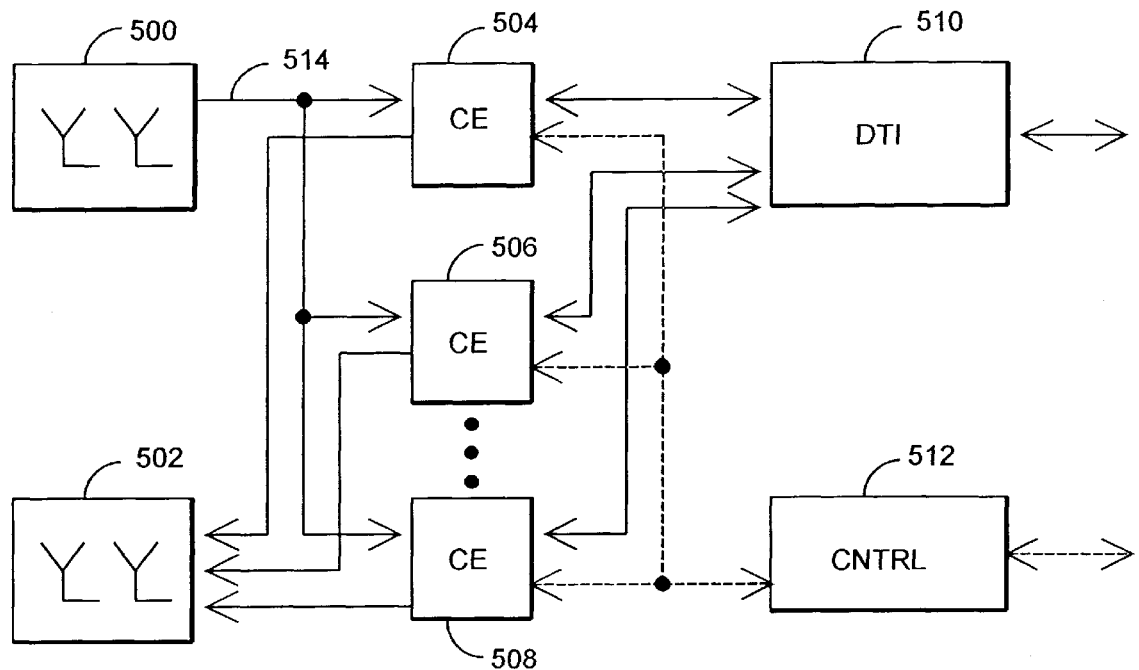
FIG. 8 is a block diagram illustrating a possible structure of a receiver according to the invention.

In the following, the structure of a receiver according to the first embodiment of the invention will be described. FIG. 8 is a block diagram illustrating the structure of a receiver according to the invention. The receiver comprises an antenna group 500 consisting of L separate antenna elements. The antenna group may be linear, planar (two-dimensional) or omnidirectional. The antenna group 500 receives a multipath-propagated signal that is delayed in different ways, from several different directions from each mobile station with each of the L elements, performs the preamplification, converts the signal into an intermediate frequency and digitizes all the L signals. The obtained L digital complex l,Q samples 514 are supplied into an input of channel elements 504, 506, 508.

Each active mobile station communicating with the base station is serviced by one channel element, which performs digital signal processing both on the received signal and on the signal to be transmitted, as will be described in greater detail below. Each channel element comprises a $(\alpha\ \tau)$ receiver and a corresponding transmitter. The digital shaping functions of the antenna beam, realized by means of signal phasing, are performed in a channel element, both in the transmission direction, and in the direction of reception.

In the direction of reception, a channel element filters the signal in regard to the angle-space domain, demodulates the received signal components and combines them in a diversity combiner, and, in the end, decodes the signal that has been received from the mobile station and that has been combined. The obtained user data bits are supplied further to a baseband unit 510, which forwards them to other parts of the network.

In the transmission direction, the user data bits arrive from the other parts of the network to the baseband unit 510, which forwards them to the correct channel element 504 to 508, where they are encoded, modulated by a spreading code, and subjected to the phasing of the signal to be transmitted, the phasing determining the directions of the antenna beams to be transmitted. The obtained L signals are supplied to each of the L elements of the antenna group 502. In practice, the reception and transmission antenna groups 500, 502 may be either separate or implemented by means of the same physical antenna group, where the directions of transmission and reception are separated, using suitable duplex filtration.

In the transmission antenna group 502, the signals that have arrived from each channel element and that are intended to be transmitted by each antenna element are converted into analog form, transferred to a radio frequency and transmitted via the respective antenna elements.

In the arrangement according to the invention, the transmission and reception antenna groups may comprise a different number of antenna elements, even though the description above discloses the same number L of elements in each group for the sake of simplicity. The figure also shows a control block 512, which controls the operation of the different units of the equipment, such as the allocation of the channel units to different connections according to the messages from the base station controller.

Figure 9:
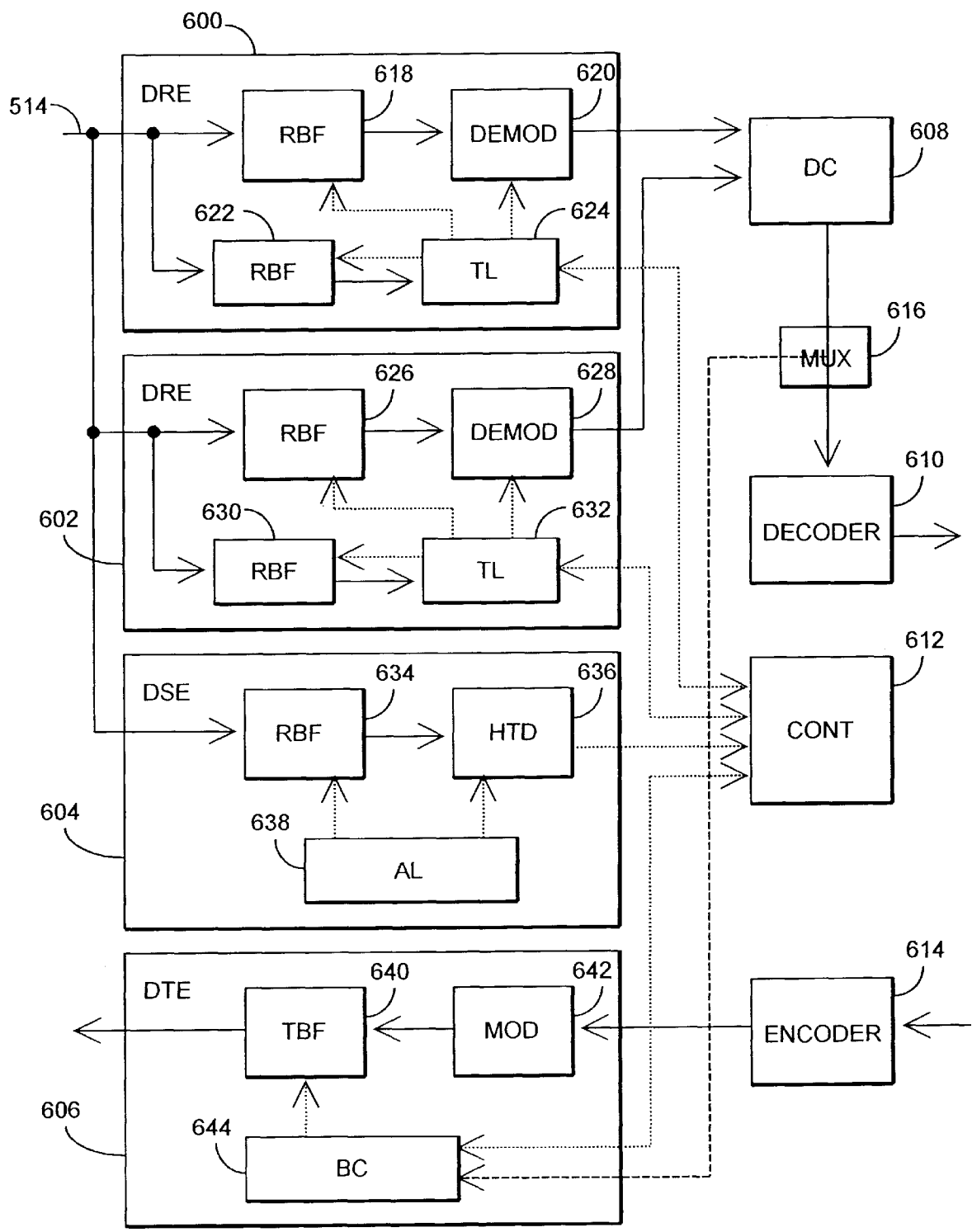
FIG. 9 is a block diagram illustrating an example of the structure of an individual channel element.

FIG. 9 is a block diagram illustrating the structure of a channel element in a receiver according to the first embodiment of the invention. The channel element comprises one or several digital receiver units 600, 602 two of which are shown in the figure, one or several searcher units 604 one of which is shown in the figure, a diversity combiner 608 the input of which comprises a signal from the receiver units, a decoder 610 to the input of which a signal that is visible at the output of the diversity combiner 608 is connected, and control means 612. The L digital complex l,Q samples 514 arriving from the antenna group are supplied to the input of all the digital receiver units 600, 602 and searcher units 604. If the arrangement according to the invention is applied in a transmitter-receiver, the transmitter-receiver according to the invention also comprises an encoder 614 and a digital transmission unit 606.

The operation of the digital searcher unit 604 is examined first with reference to FIG. 9. In the same way as in a conventional rake receiver, the function of the searcher unit is to search for the desired signal components from the received signal. In the arrangement according to the invention, a new type of searcher unit continuously monitors the received signal in the $(\alpha\ \tau)$ domain and searches for useful signal components and gives their parameters, i.e. the angle of arrival (AoA) and the delay profile, to the control means 612, which, in turn, allocate a required number of receiver units for demodulating the best components. The receiver according to the invention can naturally also be implemented in such a way that a channel element does not comprise separate control means 612, but the searcher unit 604 forwards the information concerning the signal components to be monitored directly to the receiver branches 600, 602.

The searcher unit comprises means 634 for phasing the signal supplied from the radio-frequency parts of the antenna group, and means 636 for detecting whether the signal obtained from the output of the phasing means 634 comprises a signal component received with the given delay and for measuring the quality of this signal component. The searcher unit further comprises means 638 for controlling the aforementioned phasing means 634 and the measuring means 636 in such a way that the incoming directions and delays of the received signal can be measured.

The means 634 for phasing the signal supplied from the radio-frequency parts of the antenna group can be implemented, for example, with equipment of the type described above and shown in FIG. 5, the equipment comprising the multiplication of the signal with complex coefficients $w_i$ (i=1, . . . ,L) by means of which it is possible to determine the angle of arrival of the signal that is visible amplified in the output signal of the phasing means. Each combination of the coefficients corresponds to a certain combination of antenna beams, as described above. The phasing means (634) are controlled by the means 638 so that all the essential incoming directions of the signal can be examined.

The output of the phasing means thus shows a signal that corresponds to the signal received from a given direction, on the basis of the control of the means 638. The measuring means 636 perform a measurement with different delays on a signal visible at the output of the phasing means, the purpose of the measurement being to detect the signal components that have different delays. The delay to be measured each time is set with the aforementioned means 638. In the measuring means, the signal situated at the input of the means is subjected to despreading, measurement of the complex signal energy, and squaring of the energy for example over the coherence time of the channel, and comparison of the obtained measurement result with the given threshold value. The parameters of the measured signal components having a strength exceeding the given threshold value, i.e. the angle of arrival, delay and power, are provided to the control means 612 of the channel element.

The means 638 thus control the operation of the phasing means 634 and the measuring means. The means 638 correspond to a synchronization loop provided in the searcher branch of a conventional rake receiver, even though in the arrangement according to the invention the means operate in a new manner. The search for the desired signal components from the ($\alpha$ $\tau$) domain can be implemented in many ways under the control of the means 638. As stated above, the measurement of the signal power can be replaced with some other measurement of the signal quality.

The digitized signal received by the antenna group can be phased in the phasing means 634, step by step in such a way that the direction angle of the greatest gain is changed with given angle intervals. From among the possible incoming directions, one selects a representative group of angles of arrival $\alpha_j$ which are situated at desired angle intervals from one another, and each incoming direction is subjected to several energy measurements at different delay values, whereby a delay profile $\tau_k$ is obtained for the incoming directions.

Another way is to direct the measuring means 636 to first measure the delay profile $\tau_k$ of the received signal, for example with a non-directional antenna pattern. The possible delays with which signal components are received are thus detected. The phasing means 634 are thereafter directed to sweep the different direction angles by means of a narrow directional beam, and the measuring means are simultaneously guided to measure with the aforementioned delay values detected in the first measurement. The incoming directions $\alpha_j$ of the components that have arrived with different delays are thus obtained.

The parameters of the detected signal components are thus given to the control means 612 of the channel element. The control means allocate the receiver elements 600, 602 to receive and demodulate the best detected signal components by informing the receiver element of the incoming direction and delay of the respective at least one signal component. As stated above, the receiver elements can also be controlled directly by the searcher unit 604 without separate control means.

In the arrangement according to the invention, the channel element comprises control means 612 for calculating the distance of the respective terminal equipment from the base station, and the distance can be calculated on the basis of the transmission delay. The location of the respective terminal equipment is also calculated correspondingly by means of the direction angle of the respective signal and the respective distance. The calculated data is transmitted to the base station controller 188, which performs the updating of the measurement list, or alternatively, the need for updating the measurement list can also be determined in the control means 612.

The operation of the digital receiver unit 600, 602 will be examined next with reference to FIG. 9. In the same way as in a conventional rake receiver, the function of the receiver unit is to receive and demodulate a given signal component. Assume that the control means 612 of the channel element have allocated a receiver unit to receive a particular signal component, the parameters of which are the angle of arrival $\alpha_j$ and the delay $\tau_k$.

The receiver unit 600, 602 comprises monitoring means 624, 632 to which the control means 612 of the channel element forward the information about the phase and incoming direction of the signal component to be monitored. The monitoring means control the first phasing means of the receiver unit, the input of which is the digitized signal obtained from the antenna group. The phasing means 618, 626 have a similar structure to that of the phasing means 634 provided in the searcher unit. On the basis of the information that concerns the angle of arrival $\alpha_j$ and that is received from the control unit, the monitoring means set the complex weighting coefficients $w_i$ (i=1, . . . ,L) in such a way that a signal arriving from the desired incoming direction is visible at the output of the phasing means. This can thus be understood as a receiver antenna beam pointing in the desired direction and having a predetermined shape.

The receiver unit 600, 602 further comprises demodulation means 620, 628 the input of which comprises a signal obtained from the phasing means 618, 626. The monitoring means 624, 632 guide the demodulation means to synchronize with a signal component arriving with a given delay $\tau_k$. In the demodulation means, the signal is subjected to despreading and demodulation according to known technology, using the given $\tau_k$ as the code phase. The obtained symbols are supplied to the other parts of the channel element, together with the delay data.

The receiver unit 600, 602 further comprises second phasing means 622, 630, the input of which comprises a digitized signal obtained from the antenna group. The output signal of the second phasing means is supplied to the monitoring means 624, 632. The monitoring means control the operation of the second phasing means by measuring with the means the environment of the current parameters ($\alpha_j$, $\tau_k$) of the signal component allocated to the receiver in order to detect possible changes in the incoming direction and delay of the received signal component. For this purpose, the second phasing means comprise complex coefficients similar to the first phasing means for phasing the signal, and means similar to the measuring means 636 situated in the searcher unit for measuring the impulse response. If the monitoring means detect, by means of the second phasing means, changes in the incoming direction $\alpha_j$ or delay $\tau_k$ of the desired signal component, they update this data to the first phasing means and to the demodulation means.

The prior art discloses several manners in which the monitoring means 624, 632 can be implemented in a spread spectrum system, for example Early-Late gates that can be used in the arrangement according to the invention. These circuits estimate the code timing error by performing two energy measurements with the given time difference $\Delta\tau$, which is typically a fraction of the chip time of the spreading code in the environment of the current set point $\tau_k$. The energy measurements are performed with the measuring means of the second phasing means 622, 630, which provide the correction data required by the nominal set point $\tau_k$ as the delay changes.

Correspondingly, changes in the angle of arrival $\alpha_j$ of the signal can be monitored by means of the second phasing means. It is, for example, possible to perform, with the given delay $\tau_k$, two or more energy measurements with antenna beams which have been deflected by an angle $\Delta\alpha$ in both directions from the current angle of arrival $\alpha_j$ by means of phasing. The degree of the deflection $\Delta\alpha$ used is typically a fraction of the width of the antenna beam.

The monitoring means 624, 632 thus control the energy measurements performed by the second phasing means 622, 630, so that a signal could be received with the greatest possible energy at all times. The monitoring means update the data about the changed parameters ($\alpha_j$, $\tau_k$) to the first phasing means, to the demodulation means and also to the control means 612 of the channel element, so that the data can be used in the transmission direction, if required.

The above-described maximization of the received signal can be compared with the receiver antenna diversity used in conventional systems, wherein a signal is received using two or more antennas situated from each other at a distance having the length of several wavelengths of the received signal. In the receiver according to the invention, if a signal received with the angle of arrival $\alpha_j$ is caught in a deep and long fading situation, the fading can probably be eliminated by changing the angle of the receiver beam by a small angle $\Delta\alpha$. There is thus no need for two separate antennas situated at a given distance from each other.

Due to the above-described deflection, the direction of motion of the terminal equipment 102 can also be calculated in the control means 612, and this information can be used for updating the measurement list.

The operation of the diversity combiner 608 and the decoder 610 of the channel element is similar as in the prior art diversity receivers. The combiner 608 combines the symbol sequences arriving from the different receiver elements by taking into account and compensating for their different delays $\tau_k$, and possibly by weighting the different symbol sequences according to their signal-to-noise ratios, in order to obtain maximum ratio combination. The combined symbol sequence thus obtained is supplied to the decoder 610, which decodes the symbols to user data bits, usually performing the deinterleaving first. The CDMA applications generally use a strong convolutional coding for which the best method of detection is the Viterbi algorithm providing a soft decision.

It is clear that the above-described channel element can also be used for monitoring and receiving an access channel. The antenna beams used in the direction of reception then have wider antenna patterns, i.e. they can be for example 120° wide, since the exact location of the mobile stations transmitting call-set-up messages is not known.

The operation of the digital transmission unit 606 will be examined next with reference to FIG. 9. The user data bits are first supplied to the encoder 614, which encodes the bits, typically using a convolutional code, and performs interleaving on the encoded symbols. The obtained interleaved symbols are applied to a spread spectrum modulator 642, which performs conventional modulation. All the above-described functions can be performed according to known technology.

In the present invention, the transmission unit comprises means 644, 640, however, for controlling and phasing digitally the signal to be transmitted in response to the received signal. In the transmission unit according to the invention, the means 644 for adjusting the transmission beam receive from the control means 612 of the channel element information in their input about the incoming directions used in the different receiver units 600, 602 for receiving a signal from the mobile station. The control means 612 may also report the other incoming directions of the signal detected by the searcher unit 604, but not all the directions are necessarily used in the reception of the signal.

The means 644 of the transmission unit for adjusting the transmission beam control the phasing means 640, which calculate from predetermined beam-forming functions J×L a complex weighting coefficient $w_{ij}$ (i=1, . . . L; j=1, . . . ,J) which produces J antenna beams by means of L antenna elements. In addition to the direction and number of the antenna beams, the means 644 control the phasing means 640 by indicating the transmit power that is to be used with each beam and that the means 644 obtain from the control means 612 of the channel element.

The structure of the phasing means 640 may be similar to the phasing means 618, 626, 634 described above in relation to the direction of reception. In the phasing means, the digitized (I,Q) samples of the outbound signal supplied from the modulation means 642 are thus multiplied by L complex weighting coefficients where L is the number of the antenna elements, as follows:

$$v_i = \sum_{j=1}^{J} g_j w_{ij}, i = 1, \ldots, L$$

whereby L complex sample sequences are obtained for the antenna group. The complex multiplication also uses a real scaling factor $g_j$ (j=1, . . . ,J), which is obtained from the adjusting means 644 and which can be used for the independent power adjustment of each antenna beam. The adjusting means 644 also indicate the frequency to be used, so that the weighting coefficients $w_{ij}$ can be set correctly.

The means 644 for adjusting the transmission beam control the phasing means 640 on the basis of the information obtained from the control means of the channel element. The adjustment can be performed in many ways, by modifying the parameters $\alpha_j$ and $g_j$ (j=1, ... ,J) in different ways. For example, the transmit power used with some antenna beams can be independently adjusted, or the direction angle $\alpha_j$ of some antenna beams can be changed, by a given angle $\Delta\alpha$, or the number of the antenna beams used can be altered. With these measures, it is possible to compensate for the deteriorations of signal quality, such as fadings, occurring over the radio path.

In the arrangement according to the invention, the adjusting means 644 of the transmission unit 606 can deflect the direction of one or several of the used antenna beams by small degrees $\Delta\alpha$ in the environment of the given direction angle $\alpha_j$. Due to such deflection, it is possible to reduce the likelihood that the mobile station would be in a deep fading for a long time. Since the direction angle of an antenna beam continuously vibrates around a nominal direction angle $\alpha_j$, a signal that has propagated over the radio path does not continuously use the same route.

Figure 10:
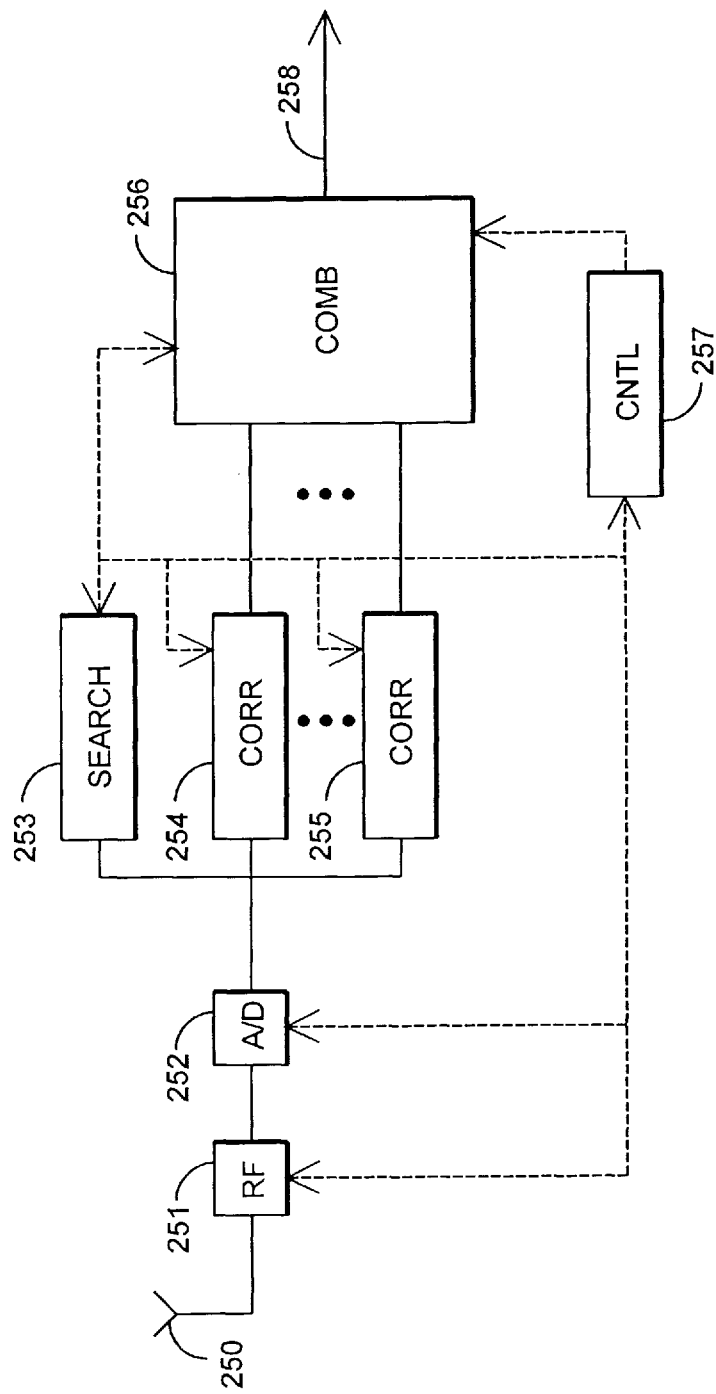
FIG. 10 is a block diagram illustrating an example of the structure of a subscriber equipment in a cellular radio system according to the invention.

A possible subscriber equipment in the cellular radio system according to the invention is illustrated in FIG. 10 by means of a block diagram, as regards the receiving end. The terminal equipment also comprises a transmitting end, but it has not been described, for the sake of simplicity, since, with respect to the invention, the transmission functions can be implemented in manners known for a person skilled in the art. The terminal equipment comprises an antenna 250, which receives a signal that is supplied to radio-frequency parts 251, which amplify the signal and convert it to an intermediate frequency. The output of the radio-frequency parts 251 is connected to converter means 252, which convert the signal into digital form.

From the converter means 252, the signal is supplied to a group of correlators 254, 255, wherein correlation with the received signal and the desired spreading code is calculated, whereupon the signals multiplied by the desired spreading code are restored to their original band for demodulation. From the converter means 252 the signal is also supplied to a searcher correlator 253 the function of which is to search from the received signal for the phases of the signal components transmitted with the desired spreading code. The terminal equipment further comprises combining means 256, which preferably combine the received signal components either coherently or incoherently. From the combining means the signal 258 is supplied further to other parts of the terminal equipment.

The terminal equipment also comprises control means 257, which control the operation of the equipment. The control means 257 are typically implemented by means of a signal processor. The searcher correlator 253 indicates the delays and strengths of the signal components it has found to the control means 257 and to the receiver correlators 254, 255, which are synchronized with the strongest signals. The searcher correlator 253 also performs the measurement of the signals from the base stations on the measurement list. The control means 257 update the measurement list on the basis of the control from the base station.

The second preferred embodiment of the invention, wherein the analog phasing of a received signal is applied in the CDMA system, will be described below.

Figure 11:
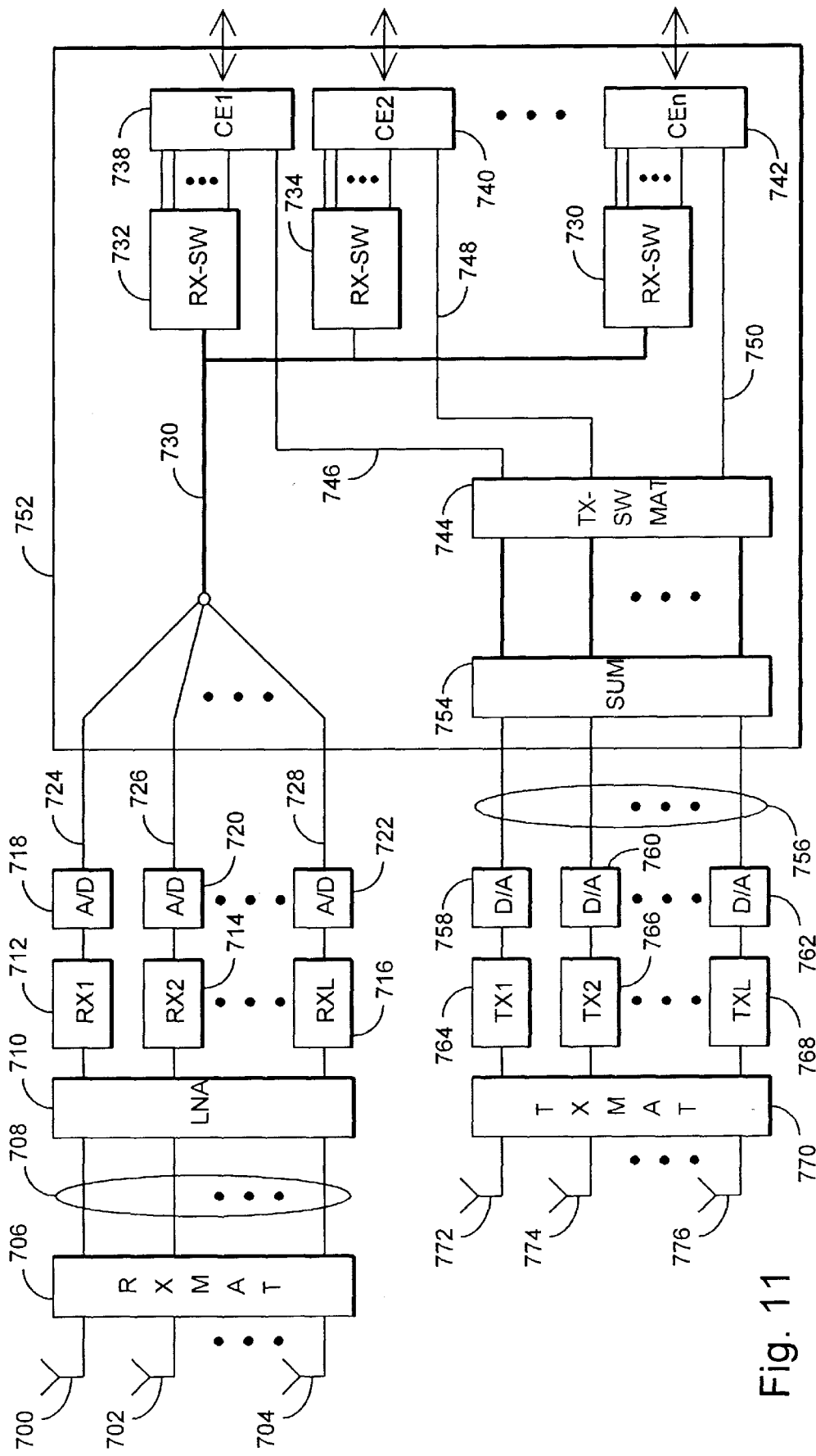
FIG. 11 is a block diagram illustrating another possible example of a receiver according to the invention.

FIG. 11 is a block diagram illustrating an example of the equipment according to the second preferred embodiment of the invention. The equipment comprises, in the direction of reception, a given number L of antenna elements 700 to 704 and in the transmission direction, a group of antenna elements 772 to 776. In the transmitter-receiver, the transmission and reception antennas may be the same, whereby duplex filtration is used to separate the different transmission directions from one another. The figure shows different antenna elements for the different transmission directions. The group formed by the antenna elements may be linear, planar (two-dimensional) or omnidirectional. The antenna group receives a multipath-propagated signal that is delayed in different ways from several different directions with each of the L elements, from each mobile station.

The antenna elements are connected to an RX matrix 706, which performs phasing on the analog signal received by the antenna elements in such a way that the matrix output 708 comprises K signal outputs each of which corresponds to a signal received by an antenna beam pointing in a predetermined signal incoming direction. The matrix can be implemented by means of prior art arrangements, such as a Butler matrix that is realized using passive 90° hybrids and phase shifters. The number K of the antenna beams produced with the matrix 706 does not necessarily correspond to the number L of the antenna elements.

The antenna beams are thus obtained in the direction of reception by phasing the signal received by the antennas and in the transmission direction by phasing the signal to be transmitted by the antennas. The antenna beams used are constant and their directions cannot be changed. The number of the antenna beams depends on the matrix 706 implementation and the beams can be set at desired angle intervals from one another and formed with a desired width.

The matrix output signals 708 are applied, if necessary, to a group of low-noise amplifiers 710, which compensate for the cable attenuations and other losses. The L signals amplified in this manner are supplied to the radio-frequency parts 712 to 716, which subject each signal to down-conversion in an intermediate frequency and to the required filtrations. The radio-frequency parts can be implemented in a manner according to known technology.

The intermediate-frequency signals are then applied to converter means 718 to 722, which convert the analog signal into digital samples. The conversion can be performed in manners according to known technology using commercially available components. Typically, complex sampling into I and Q components is performed in the means.

The output signals 724, 726, 728 of the converter means 718, 720, 722 are supplied further to a group of channel elements 738, 740, 742 via an RX switch 732, 734, 730 preceding each channel element. All the output signals 730 of the converters are applied to all the RX switches. Each RX switch thus comprises K inputs and one or several output signals that are applied to a corresponding channel element. The function of the RX switch is to guide a signal received by a desired antenna beam to a desired component of the channel element according to control from the channel element.

The above-described receiver structure can also be implemented in such a way that one or several of the aforementioned parts (antenna elements 700–704, amplifiers 710, radio-frequency parts 712–716 and converter means 718–722) are located either integrated together or separately. In such a case, the details of the implementation vary, as it is evident for a person skilled in the art, for example in such a way that if the radio-frequency parts are situated in connection with an antenna group, there is no need for amplifiers 710.

Figure 12:
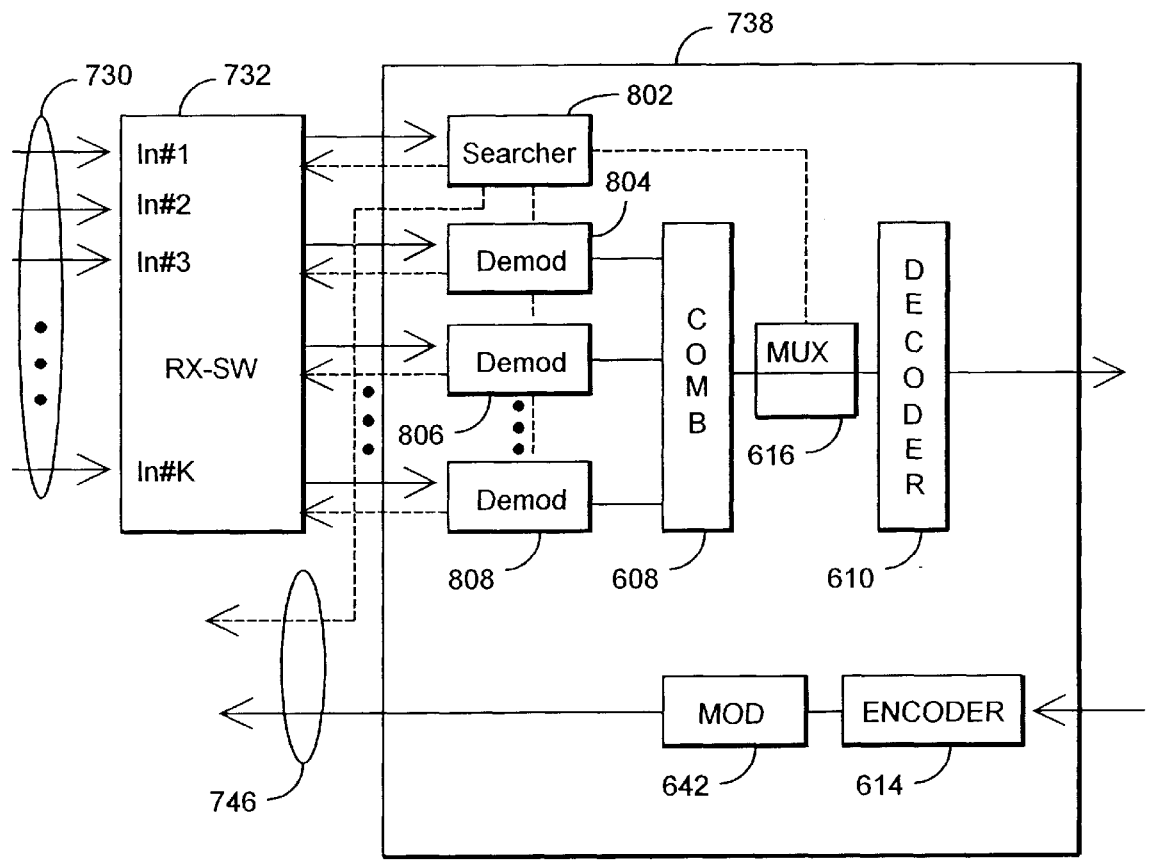
FIG. 12 illustrates another example of the structure of an individual channel element.

In the following, the structure and operation of a channel element in a receiver according to the second embodiment of the invention will be described by means of the block diagram of FIG. 12. The channel element comprises one or several means 804, 806, 808 for demodulating a signal, the figure showing three of the means, one or several searcher units 802 one of which is shown in the figure, a diversity combiner 608 the input of which comprises a signal from the receiver units, and a decoder 610 to the input of which a signal visible at the output of the diversity combiner 608 is connected.

The inputs ln#1 to ln#K of the RX switch 732 thus comprise the K signals 730 from the converter means 718 to 722. The channel element 738 thus comprises a searcher unit 802 the function of which is to perform the search for the best signal components from the multidimensional signal domain, as described in connection with the searcher unit of the first embodiment. In the present embodiment, the searcher unit 802 searches for the best signal components from the inputs of the RX switch, each of which thus corresponds to a signal component arriving from a certain direction, by measuring the delay profile from each input of the RX switch. The measurement of the delay profile can be performed in the same manner as in the searcher branch of a conventional rake receiver. As a result of the measurement, the searcher branch thus detects the incoming directions and delays of the best signal components. The searcher unit guides the demodulation means 804, 806, 808 to synchronize with the best components by providing each demodulation means with information about the delay of the desired component and by applying the signal of this direction from the RX switch to the corresponding demodulation means.

The demodulation means 804, 806, 808 thus demodulate the given signal, monitor the changes in the delay and incoming direction of the signal, and start receiving a new antenna beam by means of the RX switch, if required. The output signals of the demodulation means are applied to a diversity combiner 608, which preferably combines the demodulated symbols and detects the information transmitted. The output signal of the diversity combiner is applied further to decoding means 610, which deinterleave the symbols and decode the information sequence.

The above-described receiver structure thus implements the arrangement according to the invention by means of analog phasing. In the reception, a number (K) of fixed antenna beams are produced by means of the phasing, the strongest signal components being selected for demodulation from the components received by the antenna beams. As the terminal equipment moves and the incoming directions of the signal change, the signal of the antenna beam providing the best signal strength is always selected for demodulation.

In the equipment according to the second preferred embodiment, the distance of the terminal equipment from the base station is calculated in the unit 802, for example by means of the transmission delay, and the location of the terminal equipment is calculated on the basis of the calculated distance and the antenna beam used by means of a known direction angle. On the basis of this information, the need for updating the measurement list of the terminal equipment can be estimated.

The receiver structure according to the second preferred embodiment of the invention will be examined below with reference to FIG. 12.

The user data bits are first supplied to an encoder 614, which encodes the bits, typically by using a convolutional code, and performs interleaving on the encoded symbols. The obtained interleaved symbols are applied to a spread-spectrum modulator 642, which performs conventional modulation. All the above-described functions can be performed according to known technology.

In the present invention, the receiver implementation further comprises means 802 for controlling the analog phasing of the signal to be transmitted in response to the received signal. On the basis of the measurements it has performed, the searcher unit 802 knows the directional angles and the corresponding antenna beams which receive the best signal components. The searcher unit has thus allocated a group of demodulation means to receive these components. In a practical implementation, the control of the transmitting end can take place in the searcher unit or in a separate control unit. For the sake of simplicity, only the first alternative is described herein, without limiting the invention thereto, however. In any case, the idea of the invention is the same in both alternatives. As described above, in the arrangement according to the invention the detected incoming directions comprising a good signal level are used when transmitting a signal to the opposite transmission direction.

The implementation of the transmitter part will be examined below by means of FIG. 11. The transmitter comprises a given number L of antenna elements 772, 774, 776, which may thus be the same as the antenna elements in the direction of reception. The antenna elements are connected to a TX matrix 770, the function of which is to analogically phase the signal to be transmitted to different antenna elements, so that the main beam of the directivity pattern points in the desired direction. The input of the TX matrix comprises K signals 756, which have been converted into analog form in D/A converters 758 to 762, converted into a radio frequency and amplified in radio-frequency parts 764 to 768. As already mentioned in connection with the description of the receiving end, the above-described components can be implemented in practice in several ways, either together or separately, as it is clear for a person skilled in the art.

The TX matrix phases the K signals situated at the input in such a way that the antennas provide antenna beams to K different directions, the directions of the antenna beams being fixed and the beams covering together the desired area. The implementation of the TX matrix 770 is similar to that for the RX matrix 706, and it can be realized for example with a Butler matrix that is implemented with passive 90° hybrids and phase shifters. The number K of the antenna beams produced with the matrix 770 does not necessarily correspond to the number L of the antenna elements.

Figure 13:
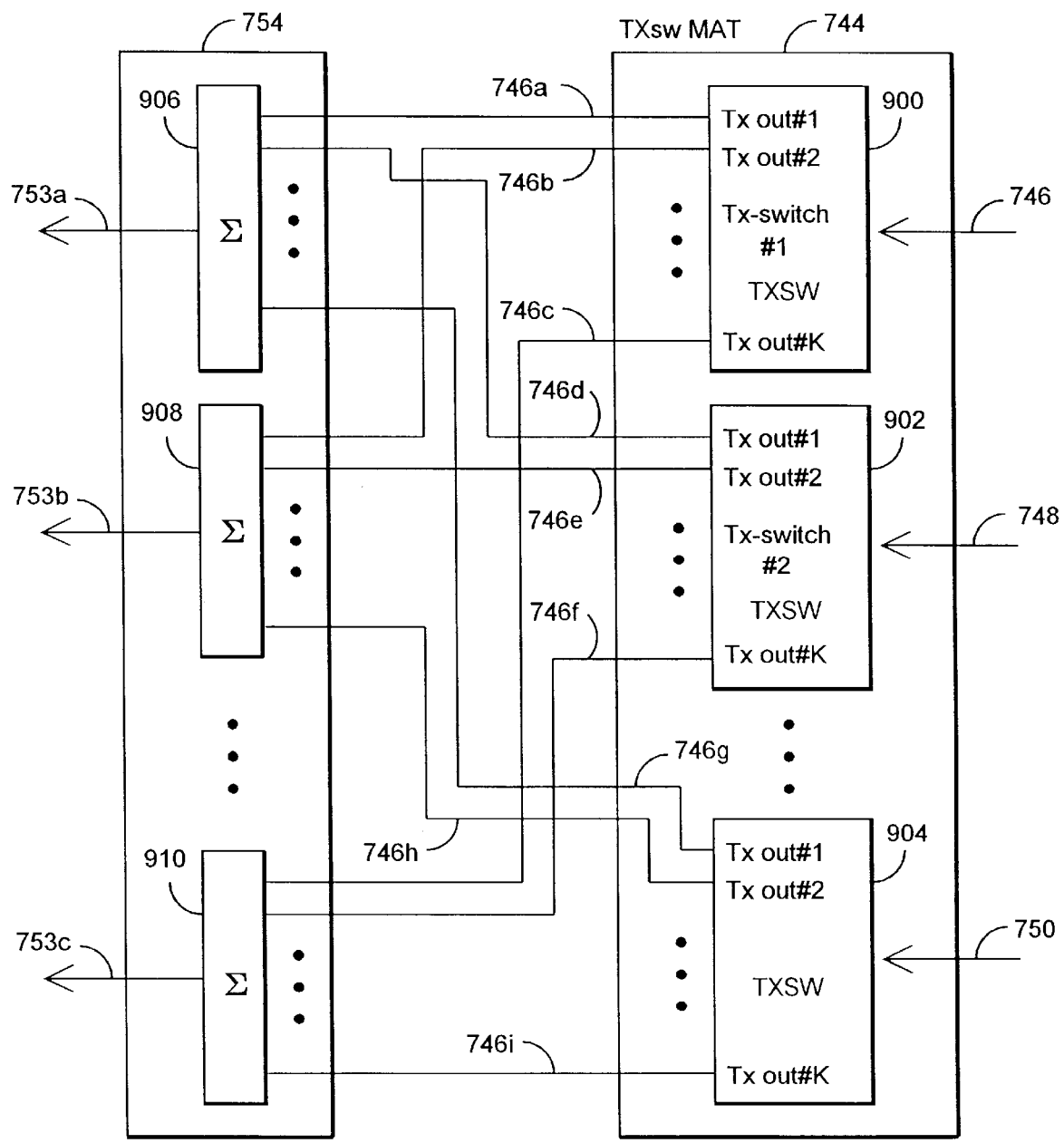
FIG. 13 illustrates more closely an example of the structure of an individual channel element.

The modulated data signal and the control 746 from the searcher unit are supplied from each channel element 738, 740, 742 to the TX switching matrix 744, from which the signals are supplied further to adding means 754. The operation of the switching matrix 744 and the adding means 754 will be examined in greater detail with reference to FIG. 13.

The TX switching matrix comprises a TX switch 900, 902, 904 corresponding to each channel unit, the input of the switches consisting of both the modulated data signal that is to be transmitted and that arrives from the channel unit, and a control signal 746, 748, 750 from the searcher unit of the channel unit. The output of the TX switch comprises K outputs 746a to 746i, i.e. as many as there are transmission antenna beams. The function of each TX switch is to route the signal from the channel element to the correct transmission beams to be summed together with signals arriving from the other channel elements and intended to the same beam on the basis of the control from the channel element. The TX switch guides the incoming data signal into one or several outputs Txout#1 to Txout#K, depending on the control from the channel element, i.e. depending on which antenna beams the signal is intended for. Each output is a quadratic digital sample weighted with the signal level.

Each output 746*a* to 746*i* of the switch is applied to one of the K adders 906 to 910 of the adding means 745. Each adder adds digitally together the data signals arriving from different channel units and intended for a given antenna beam. The required bit number for an outbound sample is obtained using the formula 2*(log(n)+m), wherein n is the number of the inputs (channel units) of the adders, log is a two-based logarithm and m is the bit number of the samples.

Each of the outputs 756*a* to 756*c* of the TX switches is applied to a corresponding converter means 758 to 762, and further to antennas via an analog phasing matrix, as described above.

The searcher unit 802 selects the antenna beams to be used in the transmission on the basis of the information it has measured.

Even though the invention is described above with reference to the examples according to the accompanying drawings, it is clear that the invention is not restricted thereto, but it can be modified in many ways within the scope of the inventive idea recited in the appended claims.

The alignment of the antenna beams can be used, for example, in both the vertical and the horizontal direction, whereby the above-described ($\alpha$ $\tau$) domain can be understood as an ($\alpha, \beta, \tau$) domain, wherein a is the vertical angle, $\beta$ is the horizontal angle and $\tau$ is the delay.

One possibility is to utilize coherent, incoherent or differentially coherent modulation and demodulation methods in the channel elements. For example, in order to enable coherent demodulation in a mobile station, the base station may include an additional spreading-coded signal without data modulation in each antenna beam as a phase reference. Alternatively, known reference symbols can be used for the same purpose.

One alternative embodiment of the invention includes positioning the digital phasing means 618 to 634 of the channel elements in one common phasing means block, which services all of the channel elements.

We claim:

1. A method for improving the reliability of a handover in a cellular radio system which has in each of a plurality of cells at least one base station arranged for communicating with respective terminal equipment of a plurality of subscribers located within a respective coverage area of each base station, comprising the steps of:

each base station, when communicating with respective ones of said terminal equipment, measuring the distance of each respective terminal equipment from the respective base station and the direction angle of the signal received from each respective terminal equipment with respect to the respective base station;

each base station calculating the location of each respective terminal equipment in the coverage area of the respective base station on the basis of the direction angle and distance of the respective terminal equipment as obtained from said measuring, and communicating results of such calculating, to the respective terminal equipment; each respective terminal equipment maintaining a list of nearby ones of said base stations;

each respective terminal equipment measuring the signal strength from those of said base stations that are in the respective list of nearly base stations maintained by the respective terminal equipment for determining the need for a handover; and each terminal equipment updating the respective list of nearby base stations maintained thereby, on the basis of the respective location calculated for the respective terminal equipment in said calculating, and, in performing said updating, taking into account the direction of motion of the respective terminal equipment;

said base stations transmitting signals to and receiving signals from the respective terminal equipment by each using a respective antenna group having a plurality of elements, by phasing the respective signal to be received and the respective signal to be transmitted, in such a way that the gain obtained from the respective antenna group is greatest in the respective directions towards those of said terminal equipments with which each respective base station is communicating;

in performing said transmitting and receiving, said base stations each detecting the angles of greatest gain of the respective antenna group towards the respective terminal equipment;

each base station, as part of said calculating, calculating the direction of motion of the respective terminal equipment by obtaining and using information as to changes with time of said respective directions; and each said base station, when communicating said results to each respective terminal equipment, including information as to the direction of motion of the respective said terminal equipment.

2. The method according to claim 1, wherein:

said maintaining includes causing the respective list of nearby base stations maintained by each terminal equipment to contain at each moment only those of said base stations to the respective coverage area of which the respective terminal equipment is estimated to be able to move on the basis of current location of the respective terminal equipment.

3. The method according to claim 1, wherein:

said calculating includes calculating the direction of motion of the terminal equipment on the basis of changes in the respective direction angles and respective delays of the respective signals received by the respective base stations from the terminal equipment with which the respective base station is communicating.

4. The method according to claim 3, wherein:

said calculating further includes estimating the future locations of the respective terminal equipment on the basis of changes in the direction angles and delays of the signals received from the respective terminal equipment.

5. The method according to claim 1, wherein:

said communicating results includes the respective base stations transmitting information about the location of each terminal equipment within the coverage area of the respective base station to a base station controller serving the respective base station, which updates, via the respective base stations, the respective lists of base stations maintained by the respective terminal equipment.

6. The method according to claim 1, wherein:

each respective terminal equipment, in maintaining and updating the respective said list, includes in the respective said list, a prioritization of nearby base stations according to the likelihood with which the respective terminal equipment will move to the respective coverage area of respective base station.

7. The method according to claim 1, wherein:

at least some of said cells are sectorized into sectors in the cellular radio system, and each terminal equipment in performing said measuring thereby measures the signal strengths from the respective sectors that are on the respective list maintained and updated by the respective terminal equipment.

8. The method according to claim 1, wherein:

as to at least some of said cells, the cellular radio system comprises overlapping microcells and umbrella cells which are implemented with phased antenna groups, and said maintaining and updating of a list of nearby base stations by each respective terminal equipment which is communicating with a base station of an umbrella cell also includes in the respective list respective microcells served by respective ones of said base stations.

9. A cellular radio system, comprising:

in each of a plurality of cells at least one base station communicating with respective ones of terminal equipment located within a respective base station coverage area:

each said base station including means for measuring the direction angle and distance of each respective terminal equipment with which the respective base station is communicating, with respect to the respective base station;

each said base station including means for calculating the location of each respective terminal equipment in the coverage area of the respective base station on the basis of the direction angle and distance of the respective terminal equipment as obtained from said means for measuring and for communicating results of such calculating, to the respective terminal equipment;

each said terminal equipment comprising means for maintaining a list of respective nearby ones of said base stations;

each said terminal equipment including means for measuring the signal strengths from the respective base stations that are in the respective list kept by the respective terminal equipment, in order to determine the need for a handover; and each respective terminal equipment comprising means for updating the respective list of nearby base stations maintained by the respective terminal equipment, on the basis of the location and direction of motion of the respective terminal equipment; said base stations being arranged for transmitting signals to and receiving signals from the respective terminal equipment by comprising a respective antenna group having a plurality of elements, by phasing the respective signal to be received and the respective signal to be transmitted, in such a way that the gain obtained from the respective antenna group is greatest in the respective directions towards those of said terminal equipments with which each respective base station is communicating;

said base stations being arranged for detecting, in conjunction with said transmitting and receiving, the angles of greatest gain of the respective antenna group towards the respective terminal equipment;

each said base station being arranged to calculate, as a part of said calculating, the direction of motion of the respective terminal equipment by obtaining and using information as to changes with time of said respective directions; and each base station being arranged to include information as to the direction of motion of the respective said terminal equipment when communicating said results to each respective terminal equipment.

10. The cellular radio system according to claim 9, further comprising:

each said base station antenna group including antenna means having changeably directable beams, and means for calculating the direction of motion of respective each terminal equipment with which the respective base station is communicating, by assuming direction angles of the respective ones of said terminal equipment, and measuring and averaging the strength of the respective signals received from the respective terminal equipment with different angles of the respective antenna beams in the respective vicinities of the respective assumed direction angles of the respective ones of said terminal equipment.

11. The cellular radio system according to claim 9, wherein:

said base stations each comprise means for transmitting information about the respective location and the respective direction of motion of each respective terminal equipment situated in the respective base station coverage area to a base station controller serving the respective base station, and means for transmitting the updated base station list for each respective terminal equipment to the respective terminal equipment on the basis of a command from the respective base station controller.

12. The cellular radio system according to claim 9, wherein:

as to at least some of said base stations the respective coverage area is divided into a plurality of sectors, and said means for maintaining of the respective terminal equipment are arranged to maintain in the respective said list, sector by sector, the base stations the power of which said means for measuring of the respective ones of said terminal equipment measure.

13. The cellular radio system according to claim 9, wherein:

at least some of said cells include overlapping microcells and umbrella cells which are realized with phased antenna groups, and the respective means for maintaining each respective list of nearby base stations maintained by each respective terminal equipment communicating with an umbrella cell is arranged to list respective microcells served by respective ones of said base stations.

14. The cellular radio system according to claim 9, wherein:

the means for maintaining and means for updating of each said terminal equipment, are arranged to including in the respective said list, a prioritization of the respective nearby base stations according to the likelihood with which the respective terminal equipment will move into the respective coverage area of the respective base station.

* * * * *